US008447170B2

(12) United States Patent
Casagrande

(10) Patent No.: US 8,447,170 B2
(45) Date of Patent: May 21, 2013

(54) AUTOMATICALLY RECORDING SUPPLEMENTAL CONTENT

(75) Inventor: Steven Michael Casagrande, Castle Rock, CO (US)

(73) Assignee: Echostar Technologies L.L.C., Englewood, CO (US)

(*) Notice: Subject to any disclaimer, the term of this patent is extended or adjusted under 35 U.S.C. 154(b) by 111 days.

(21) Appl. No.: 13/215,702

(22) Filed: Aug. 23, 2011

(65) Prior Publication Data
US 2013/0051773 A1 Feb. 28, 2013

(51) Int. Cl.
H04N 5/76 (2006.01)

(52) U.S. Cl.
USPC .......................................... 386/296; 386/291

(58) Field of Classification Search
USPC .................. 386/296, 291, 297, 298, 323, 326
See application file for complete search history.

(56) References Cited

U.S. PATENT DOCUMENTS

| 4,706,121 | A | 11/1987 | Young |
| 5,335,277 | A | 8/1994 | Harvey et al. |
| 5,684,969 | A | 11/1997 | Ishida |
| 5,805,763 | A | 9/1998 | Lawler et al. |
| 6,766,523 | B2 | 7/2004 | Herley |
| 7,487,529 | B1 | 2/2009 | Orlick |
| 7,490,169 | B1 | 2/2009 | Ogdon et al. |
| 7,493,312 | B2 | 2/2009 | Liu et al. |
| 7,542,656 | B2 | 6/2009 | Cho et al. |
| 7,577,751 | B2 | 8/2009 | Vinson et al. |
| 7,590,993 | B1 | 9/2009 | Hendricks et al. |
| 7,804,861 | B2 | 9/2010 | Kim |
| 2001/0033736 | A1 | 10/2001 | Yap et al. |
| 2002/0055343 | A1 | 5/2002 | Stetzler et al. |
| 2002/0097340 | A1 | 7/2002 | Takagi et al. |
| 2002/0152299 | A1 | 10/2002 | Traversat et al. |
| 2002/0188943 | A1 | 12/2002 | Freeman et al. |
| 2003/0200548 | A1 | 10/2003 | Baran et al. |
| 2004/0015999 | A1 | 1/2004 | Carlucci et al. |
| 2004/0162871 | A1 | 8/2004 | Pabla et al. |
| 2007/0039032 | A1 | 2/2007 | Goldey et al. |
| 2007/0165855 | A1 | 7/2007 | Inui |
| 2007/0204288 | A1 | 8/2007 | Candelore |
| 2008/0092164 | A1* | 4/2008 | Agarwal et al. ................. 725/40 |
| 2008/0152039 | A1 | 6/2008 | Shah et al. |

(Continued)

OTHER PUBLICATIONS

Author Unknown, "Move Networks is Delivering the Next Generation of Television," Move Networks, 2010, obtained online at http://www.movenetworks.com/, 2 pages.

(Continued)

Primary Examiner — Robert Chevalier
(74) Attorney, Agent, or Firm — Kilpatrick Townsend & Stockton LLP

(57) ABSTRACT

A content provider transmits instructions to a content receiver to record multiple instances of content. The instances of content are included in the same frequency band of a broadcast transmitted by the content provider via a first communication link and scrambled utilizing the same control word. The content provider determines to supplement the multiple instances of content and transmits an instruction to record a supplemental instance of content from a second content provider via a second communication link. The content receiver receives the instructions and accordingly receives, descrambles, and stores the multiple instances of content and the supplemental instance of content. In some implementations, the first communication link may be a satellite communication link and the second communication link may be a different type of communication link such as a terrestrial broadcast communication link and/or an Internet protocol communication link.

20 Claims, 4 Drawing Sheets

U.S. PATENT DOCUMENTS

| | | |
|---|---|---|
| 2008/0184327 A1 | 7/2008 | Ellis et al. |
| 2008/0271077 A1 | 10/2008 | Kim et al. |
| 2008/0291206 A1 | 11/2008 | Uchimura et al. |
| 2009/0165057 A1 | 6/2009 | Miller et al. |
| 2009/0260038 A1 | 10/2009 | Acton et al. |
| 2010/0313222 A1 | 12/2010 | Lee et al. |
| 2011/0043652 A1 | 2/2011 | King et al. |

OTHER PUBLICATIONS

International Search Report and Written Opinion of PCT/US2012/51992 mailed Nov. 2, 2012, 15 pages.

International Search Report and Written Opinion of PCT/US2012/51987 mailed Oct. 23, 2012, 20 pages.

International Search Report and Written Opinion of PCT/US2012/051984 mailed Nov. 5, 2012, 13 pages.

International Search Report and Written Opinion of PCT/US2012/52002 mailed Oct. 16, 2012, 17 pages.

International Search Report and Written Opinion of PCT/US2012/51964 mailed Nov. 2, 2012, 13 pages.

U.S. Appl. No. 13/149,852, filed May 31, 2011, Non-Final Office Action mailed Dec. 12, 2012, 9 pages.

U.S. Appl. No. 13/215,916, filed Aug. 23, 2011 Notice of Allowance mailed Jan. 4, 2013.

* cited by examiner

AUTOMATICALLY RECORDING SUPPLEMENTAL CONTENT

FIELD OF THE INVENTION

This disclosure relates generally to content recording, and more specifically to automatically recording content that is associated with other automatically recorded content and therefore supplements the other automatically recorded content (which may replace instead of adding to the other content in some cases).

SUMMARY

Content may be defined as online content if it is broadcast by a programming provider and may be defined as offline content if it is available from a source other than broadcast by the programming provider. In one or more implementations, systems and methods of the present disclosure may supplement recording of online content that is automatically recorded when broadcast by a programming provider (such as a satellite programming provider) by automatically recording one or more instances of offline content (which are associated in one or more ways with the online recorded content) from a source other than the content broadcast by the programming provider. For example, the offline content may include content broadcast by one or more terrestrial broadcast systems and/or other over-the-air content transmission systems, content available via one or more Internet protocol connections, and/or any source of content other than that broadcast by the programming provider. Further, the recorded offline content may be considered to supplement the recorded online content because the recorded offline content is associated with the recorded online content and is obtained from a source other than the broadcast of the programming provider as opposed to the recorded offline content being limited to trailers for the recorded online content and/or other such supporting content.

As such, the present disclosure discloses systems and methods for automatically recording supplemental content. One or more first content providers may transmit instructions to one or more content receivers to record multiple instances of content. The multiple instances of content may be included in the same frequency band of at least one broadcast transmitted by the content provider via a first communication link and scrambled utilizing the same control word. The content provider may determine to supplement the multiple instances of content (which may be based on associations between the multiple instances of content and supplemental content) and may transmit one or more instructions to record one or more supplemental instances of content from at least one second content provider via a second communication link.

The content receiver may receive the instructions to record the multiple instances of content and may accordingly receive and store (and/or descramble, decode, display, and/or perform other such operations) the multiple instances of content. The content receiver may also receive the instruction to record the supplemental instance of content and receive the supplemental instance of content via the second communication link and store the supplemental instance of content.

In some implementations, the first communication link may be a satellite communication link and the second communication link may be a different type of communication link such as a terrestrial broadcast communication link and/or an Internet protocol communication link.

In various implementations, the multiple instances of content may all be members of a group of content and the supplemental instances of content may be members of the group of content that are not included in the multiple instances of content, different versions of instances of content included in the multiple instances of content, instances of content that correspond to subchannels of channels that correspond to instances of content included in the multiple instances of content, and so on.

In some implementations, the supplemental instance of content may be not be available from the content provider that provides the multiple instances of content but is available from another content provider. Further, in various implementations, the supplemental instances of content may be selected based on received user input. Moreover, in some implementations, the recording of the supplemental instance of content may replace one of more of the recorded multiple instances of content.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
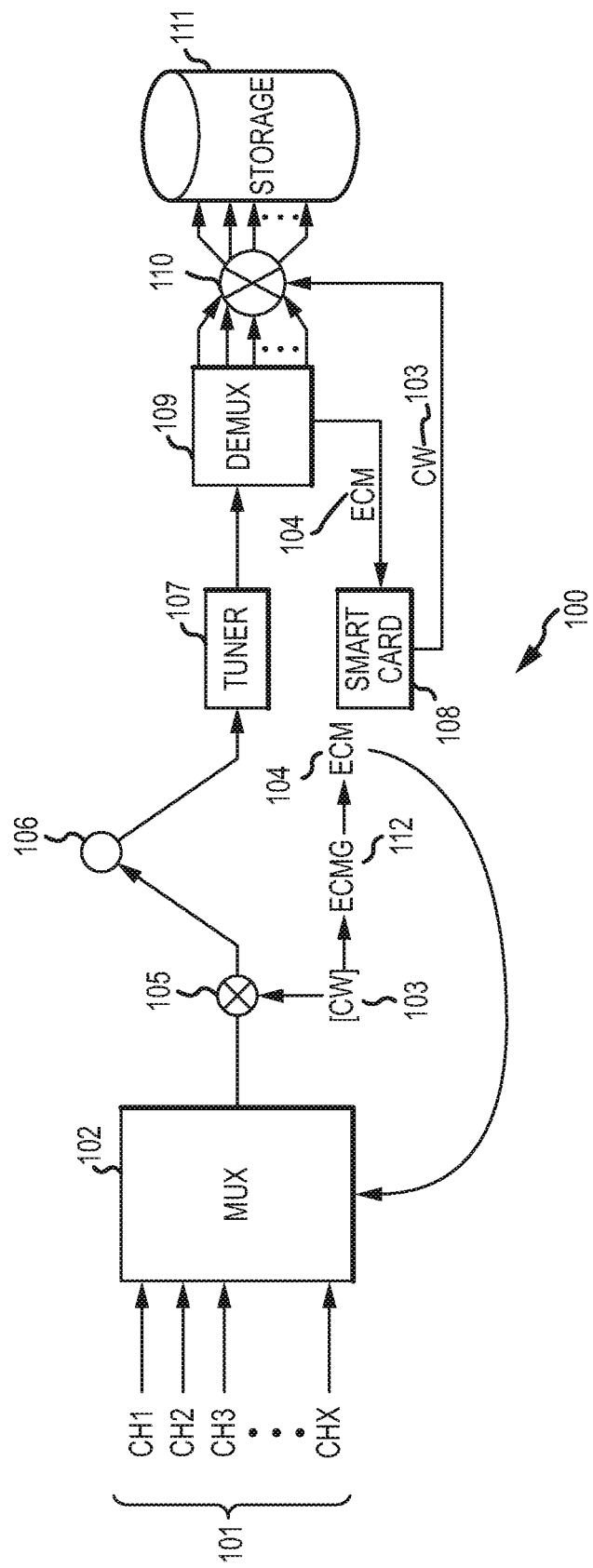
FIG. 1 is a block diagram illustrating a system for automatically recording multiple instances of content from one or more programming providers.

The description that follows includes sample systems, methods, and computer program products that embody various elements of the present disclosure. However, it should be understood that the described disclosure may be practiced in a variety of forms in addition to those described herein.

In various implementations, systems and methods of the present disclosure may supplement automatic recording of online content broadcast by a programming provider (such as a satellite programming provider) by automatically recording associated offline content from a source other than the programming provider. For example, the offline content may be obtained from one or more terrestrial broadcast systems and/or other over-the-air content transmission systems, one or more Internet protocol connections, and/or any source of content other than the programming provider. Hence, content may be considered online if it is broadcast by the programming provider and offline if it is available from a source other than broadcast by the programming provider. Additionally, the recorded offline content may be considered to supplement the recorded online content because the recorded offline content is associated with the recorded online content and is obtained from a source other than the broadcast of the programming provider. The recorded offline content is not limited to trailers for the recorded online content and/or other such supporting content because the recorded offline content is referred to herein as supplementary content.

Content receivers (such as set top boxes, television receivers, digital video recorders, mobile computers, cellular telephones, smart phones, tablet computers, desktop computers, and so on) may receive content from one or more programming providers (such as satellite television programming providers, cable television programming providers, Internet service providers, video on demand providers, pay-per-view movie providers, digital music providers, and so on) via one of more communication connections (such as satellite communication connections, coaxial cable communication connections, Internet communication connections, radio-frequency connections, and so on). Such content receivers may transmit such received content to one or more presentation devices and/or store the received content for later presentation.

Users of content receivers may desire to access different instances of content that are broadcast simultaneously and/or substantially contemporaneously by content providers. For example, many television programming viewers wish to watch different television programs that occupy the same broadcast time slot, such as the different television programs associated with the major television programs that are broadcast between seven PM and ten PM mountain time. Content receivers may attempt to address this issue by utilizing multiple tuners that can each separately present and/or record different, simultaneously broadcast instances of content. However, a separate tuner may still be required for each simultaneous or substantially contemporaneous instance of broadcast or otherwise received content that a content receiver user wishes to view and/or record. Further, in addition to separate tuners required for each instance of content, the content receiver may require sufficient resources to descramble and store each of the instances of content desired by the user.

FIG. 1 is a block diagram illustrating a system 100 for automatically recording multiple instances of content from one or more programming providers. The automatic recording of multiple instances of content provided by the system 100 may enable users of content receivers to access different instances of content that are broadcast simultaneously and/or substantially contemporaneously by content providers.

In various broadcast systems, content providers may broadcast content to a plurality of different content receivers via one or more frequency bands utilizing one or more satellites. Each multiplexed signal contained in the frequency band (sometimes referred to as a transponder) may be configured to include data related to one or more instances of content, such as one or more television programming channels. The data related to each of the programs may include multiple PIDs (packet identifiers), such as a video PID and one or more audio PIDs for a particular instance of content. The data related to each of the instances of content included in each frequency may be scrambled utilizing one or more CWs (control words), which may then be encrypted to generate one or more ECMs (entitlement control messages) which may in turn be included with the data. A content receiver may typically tune to one or more of the frequency bands to receive the multiplexed signal that contains data for a particular programming channel utilizing one or more tuners. The content receiver may process only a subset of the programming channels by keeping the data associated with the particular programming channel and discarding data received via the tuned frequency band and multiplexed signal associated with other programming channels, such as by utilizing a PID filter to keep data identified by PIDs related to the particular programming channel and discard data identified by PIDs not related to that particular programming channel. The content receiver may decrypt the ECM included with the data associated with the particular programming channel to obtain the CW, descramble the data utilizing the CW, and store and/or transmit the data (e.g., decompressed, reconstructed audio and video data) to one or more presentation devices.

As illustrated in FIG. 1, in this implementation, one or more content providers may select multiple instances of content 101 to be automatically recorded such as by utilizing predefined recording parameters. For example, a content provider may select all of the television events defined as "prime-time events" associated with all channels defined as "prime-time television channels" for a particular period of time defined as "prime time" to be automatically recorded. In other examples, the content provider may select television events associated with programming channels for a particular time period (such as a half hour, multiple hours, and/or an entire programming day) in response to user selections. After the content provider selects the multiple instances of content, the multiple instances of content may be multiplexed utilizing a multiplexer 102. The multiplexed signal (which includes the multiplexed selected multiple instances of content) may then be scrambled by a scrambler 105 utilizing one or more CWs 103. The CW may be encrypted to generate an ECM by an ECM generator 112 which may take the CW as an input (and may also include other information such as access criteria) and outputs the ECM, which may be included with the multiplexed signal. The scrambled multiplexed signal may then be included in a broadcast on a frequency band (e.g., cable, satellite), which may then be transmitted to one or more satellites 106 for broadcast. The satellite 106 may receive the frequency band (uplink frequency band) and then broadcast the multiplexed signal to a number of content receivers on a translated frequency band (downlink frequency band), such as a content receiver that includes a tuner 107.

The tuner 107 may tune to the frequency band that includes the multiple instances of content (which may be performed in response to one or more recording instructions received by the content receiver that includes the tuner from the content provider). The data received via the tuned frequency (which may be filtered by a PID filter, not shown) may be demultiplexed by a demultiplexer 109 and then descrambled by a descrambler 110 utilizing the CW before being stored in a non-transitory storage medium 111 (which may take the form of, but is not limited to, a magnetic storage medium; optical storage medium; magneto-optical storage medium; read only memory; random access memory; erasable programmable memory; flash memory; and so on) based on recording parameters, such as predefined recording parameters. The demultiplexer 109 may obtain the included ECM 104, and the ECM may be provided to a smart card 108 that may decrypt the ECM 104 to obtain the CW 103 for the descrambler 110. Hence, the multiple instances of content may subsequently all be available to a user of the content receiver (until such time as they are removed from the non-transitory storage medium) without requiring multiple tuners to receive each of the multiple instances of content, without requiring the smart card to decrypt multiple ECMs. In some implementations, the multiple instances of content may be stored in a single file.

Although the system 100 is illustrated in FIG. 1 and is described above as including a number of specific components configured in a specific arrangement, it is understood that this is for the purposes of example and other arrangements involving fewer and/or additional components are possible without departing from the scope of the present disclosure. For example, in various implementations, the multiple instances of content may be individually scrambled utilizing the CW prior to multiplexing. In another example, in some implementations, the data received via the tuned frequency may be demultiplexed before being individually descrambled utilizing the CW.

In some implementations of the system of FIG. 1, multiple instances of content may be recorded simultaneously from a single transponder and stored in the non-transitory storage medium 111 of the content receiver as a single file of multiple recorded instances of content. Upon playing of one instance of content from the single file of the multiple recorded instances of content, the content receiver may read the file incrementally so as to play the one instance of content while filtering out the other file contents (e.g., the other instance of content within the file).

The system 100 provides automatic recording of multiple instances of content from a content provider. However, the system 100 may not provide the ability to also automatically record supplemental content that is associated with the multiple instances of content. This may particularly be the case if the supplemental content is not available from the content provider, such as when a particular television channel (and/or a particular subchannel of a channel that is carried) is not carried by a content provider.

For example, the multiple instances of content may include all of the television programming aired by three of the four major television networks between the times of seven PM and 10 PM mountain time. It may be desired to automatically record all of the television programming aired by all four major television networks between the times of seven PM and 10 PM mountain time, but the content provider may not be able to provide the television programming aired by the fourth major television network. In another example, the multiple instances of content available from the content provider may have a particular resolution, but other versions of the multiple instances of content that have a higher resolution may be available from other sources. As such, a user may want to automatically record higher resolution versions to supplement the automatic recording of the multiple instances of content, possibly replacing one or more of the multiple instances of content that is automatically recorded.

The present disclosure discloses systems and methods for automatically recording supplemental content. At least one first content provider may transmit instructions to one or more content receivers to record multiple instances of content. The instructions may specify for the content receiver to record the multiple instances of content from at least one broadcast transmitted by the content provider via a first communication link (such as a satellite communication link) wherein the multiple instances of content are all included in the same frequency band of the broadcast and scrambled utilizing the same control word.

The content provider may determine to supplement the multiple instances of content and may transmit one or more instructions to record one or more supplemental instances of content from at least one second content provider via a second communication link (such as a terrestrial broadcast communication link and/or an Internet protocol communication link). The content provider may determine to supplement the multiple instances of content based on one or more associations between the multiple instances of content and the supplemental instance of content.

The content receiver may receive the instructions to record the multiple instances of content. In response to the instructions to record the multiple instances of content, the content receiver may accordingly receive the multiple instances of content via the first communication link, descramble the multiple instances of content utilizing the same control word (which may be obtained by decrypting the same entitlement control message), and store the multiple instances of content. The content receiver may also receive the instruction to record the supplemental instance of content, receive the supplemental instance of content via the second communication link, and store the supplemental instance of content. As such, the content receiver is enabled to automatically record the multiple instances of content from the first content provider as well as automatically record supplemental instances of content.

Figure 2:
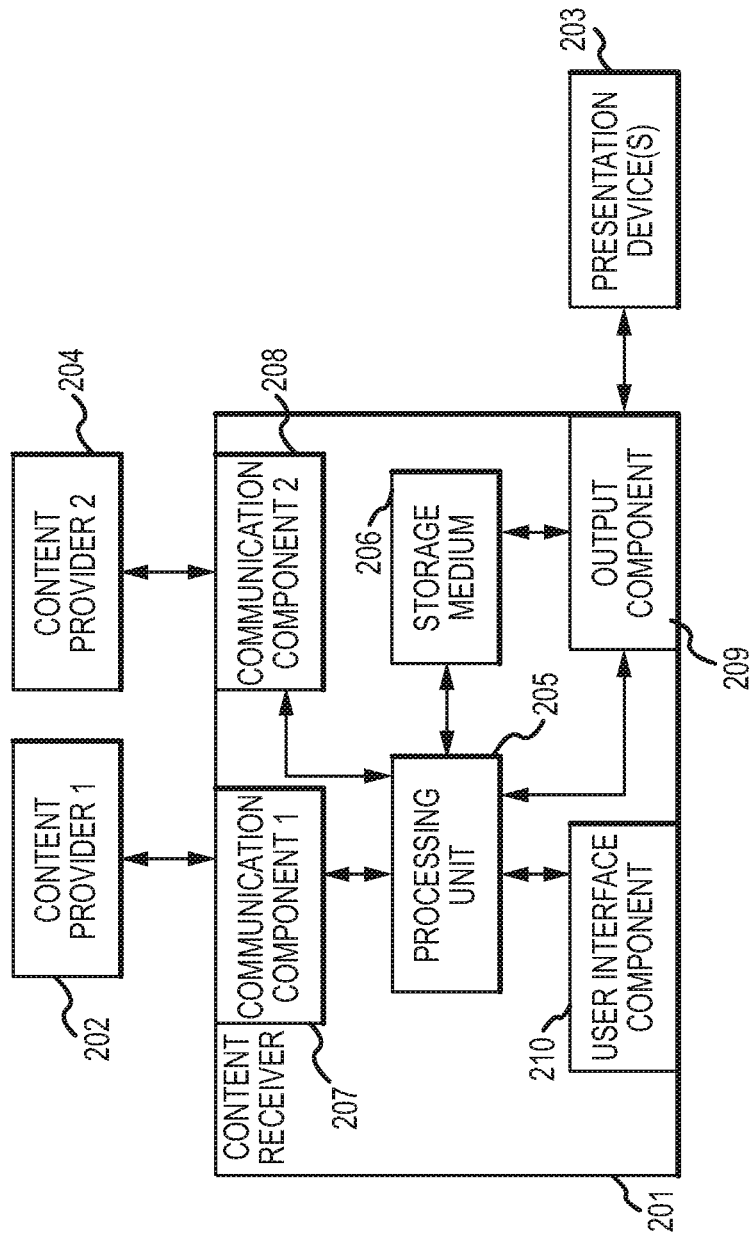
FIG. 2 is a block diagram illustrating a system for automatically recording supplemental content. This system may be interrelated with the system of FIG. 1.

FIG. 2 is a block diagram illustrating a system 200 for automatically recording supplemental content. This system 200 may be interrelated with the system 100 of FIG. 1. The system 200 includes a content receiver 201 which may be any kind of content receiver such as a set top box, a television receiver, a digital video recorder, a mobile computer, a cellular telephone, a smart phone, a tablet computer, a desktop computer, and/or any other kind of device capable of receiving content from one or more content providers. The system may also include a content provider 202 and a content provider 204, both of which may be any kind of content provider such as a satellite and/or cable television provider, a video on demand provider, a pay-per-view movie provider, a digital music provider, and/or any other provider capable of transmitting content to the content receiver. Further, the system may include one or more presentation devices 203 which may be any kind such as a cathode ray tube display, a liquid crystal display, a computer monitor, a television, a speaker, a plasma screen display, a printer, and/or any other device capable of presenting content transmitted by the content receiver.

The content receiver 201 may include one or more processing units 205, non-transitory storage media 206, communication components 1 and 2 207 and 208, output component 209, and user interface components 210. The processing unit may execute instructions stored in the non-transitory storage medium to receive content from the content provider 1 202 via the communication component 1 207 and/or receive content from the content provider 2 204 via the communication component 2 208, store such content in the non-transitory storage medium, and/or transmit such content to the presentation device 203 via the output component. The processing unit may perform such actions in response to instructions received from a user via the user interface component and/or instructions received from the content provider 1 202 via the communication component 1 207 and/or receive content from the content provider 2 204 via the communication component 2 208.

The content receiver 201 may receive instructions for automatically recording multiple instances of content from the content provider 1 202 via the communication component 207 as described with respect to FIG. 1 above (in which case the communication component 1 207 may perform the functions of the tuner 107 and the processing unit 105 may include components that perform the functions of the smart card 108, the descrambler 110, and/or the demultiplexer 109). The multiple instances of content be included in one or more broadcasts transmitted the content provider 1 202 via a first communication link (such as a satellite communication link) to the communication component 207 wherein the multiple instances of content are all included in the same frequency band of the broadcast and scrambled utilizing the same control word. Based on the instructions for automatically recording the multiple instances of content, the content receiver may receive the multiple instances of content, descramble the multiple instances of content utilizing the same control word, and store the multiple instances of content in the non-transitory storage medium.

The content receiver 201 may receive instructions for automatically recording one or more supplemental instances of content. The instructions for automatically recording the supplemental instance of content may be received from the content provider 1 202 via the communication component 207 and may specify to record the supplemental instance of content from the content provider 2 204 via a second communication link (such as a terrestrial broadcast link and/or an Internet protocol link) utilizing the communication component 2 208. The supplemental content may have one or more associations with the multiple instances of content.

As described with respect to FIG. 1 above, in some implementations, the multiple instances of content may all be members of a group of content, such as television programming aired by one or more of the major four television networks between the hours of seven PM and ten PM mountain time. In such implementations, the supplemental instances of content may include instances of content that are members of the group of content but are not included in the multiple instances of content, different versions of instances of content included in the multiple instances of content (such as higher resolution versions), instances of content that correspond to subchannels of channels that correspond to instances of content included in the multiple instances of content, and so on.

In some implementations, the supplemental instance of content may be available from the content provider 2 204 but may not be available from the content provider 1 202. Further, in various implementations, the content provider 1 202 may select the supplemental instance of content to transmit recording instructions regarding in response to user input received via the user interface component 210. Moreover, in some implementations, the supplemental instance of content may replace one of more of the multiple instances of content and the respective instance of content of the multiple instance of content may be deleted, overwritten, and/or otherwise removed from the non-transitory storage medium 206 when the supplemental instance of content is recorded.

Figure 3:
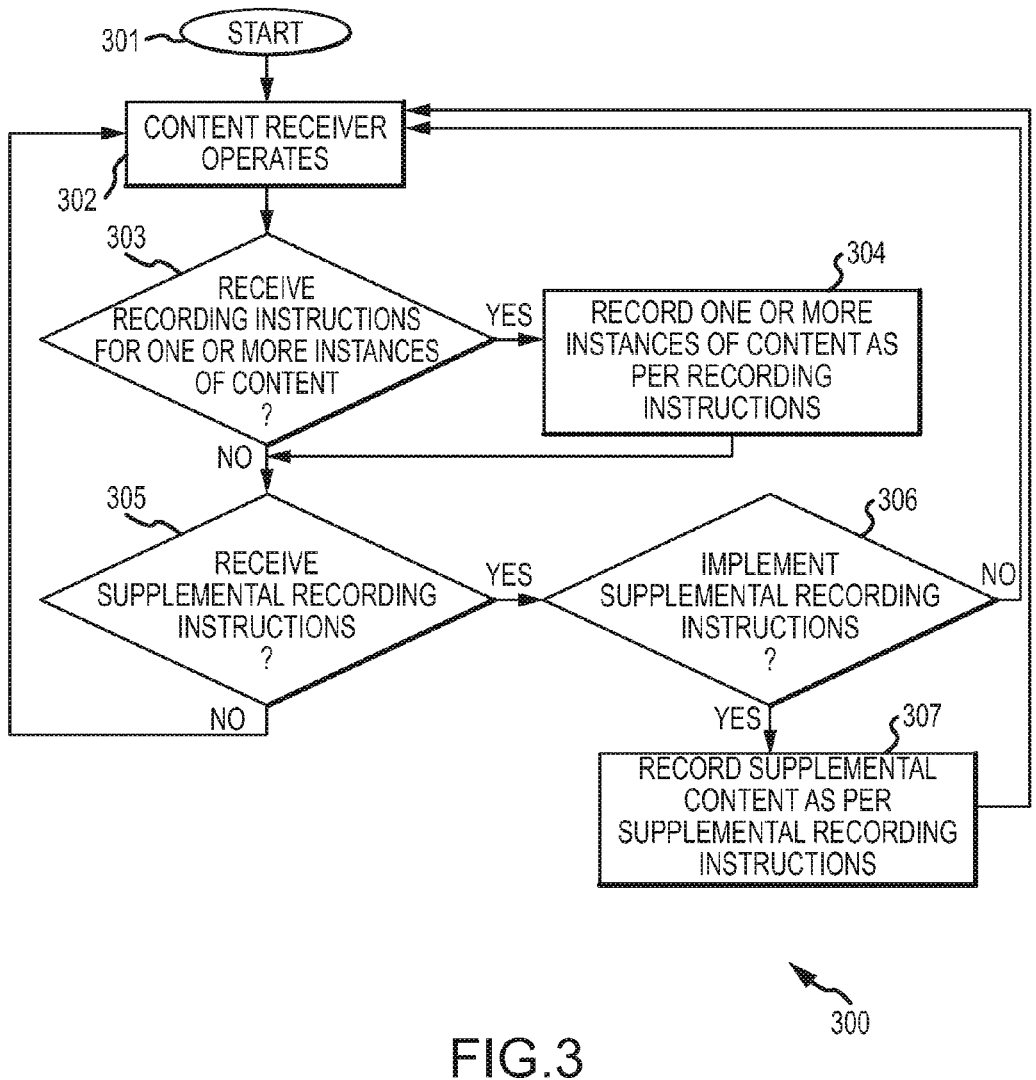
FIG. 3 is a flow chart illustrating a first example method for automatically recording supplemental content. This method may be performed by the system of FIG. 2.

FIG. 3 illustrates a first example method 300 for automatically recording supplemental content. The method 300 may be performed by the content receiver 201 of FIG. 2. The flow begins at block 301 and proceeds to block 302 where the content receiver operates. The flow then proceeds to block 303 where the processing unit 205 determines whether or not instructions to automatically record one or more instances of content have been received. If so, the flow proceeds to block 304 where the processing unit records the one or more instances of content in the non-transitory storage medium 206 before the flow proceeds to block 305. Otherwise, the flow proceeds directly to block 305.

At block 305, the processing unit 205 determines whether or not supplemental instructions to automatically record supplemental instances of content have been received. If not, returns to block 302 and the content receiver 201 continues to operate. Otherwise, the flow proceeds to block 306.

At block 306, after the processing unit 205 determines that supplemental instructions to automatically record supplemental instances of content have been received, the processing unit determines whether or not to implement the supplemental instructions to automatically record the supplemental instances of content. The processing unit may make this determination based on one or more user inputs, configuration settings, and so on. If so, the flow proceeds to block 307 where the processing unit records the supplemental instances of content in the non-transitory storage medium before the flow returns to block 302 and the content receiver 201 continues to operate. Otherwise, the flow returns directly to block 302 and the content receiver continues to operate.

Figure 4:
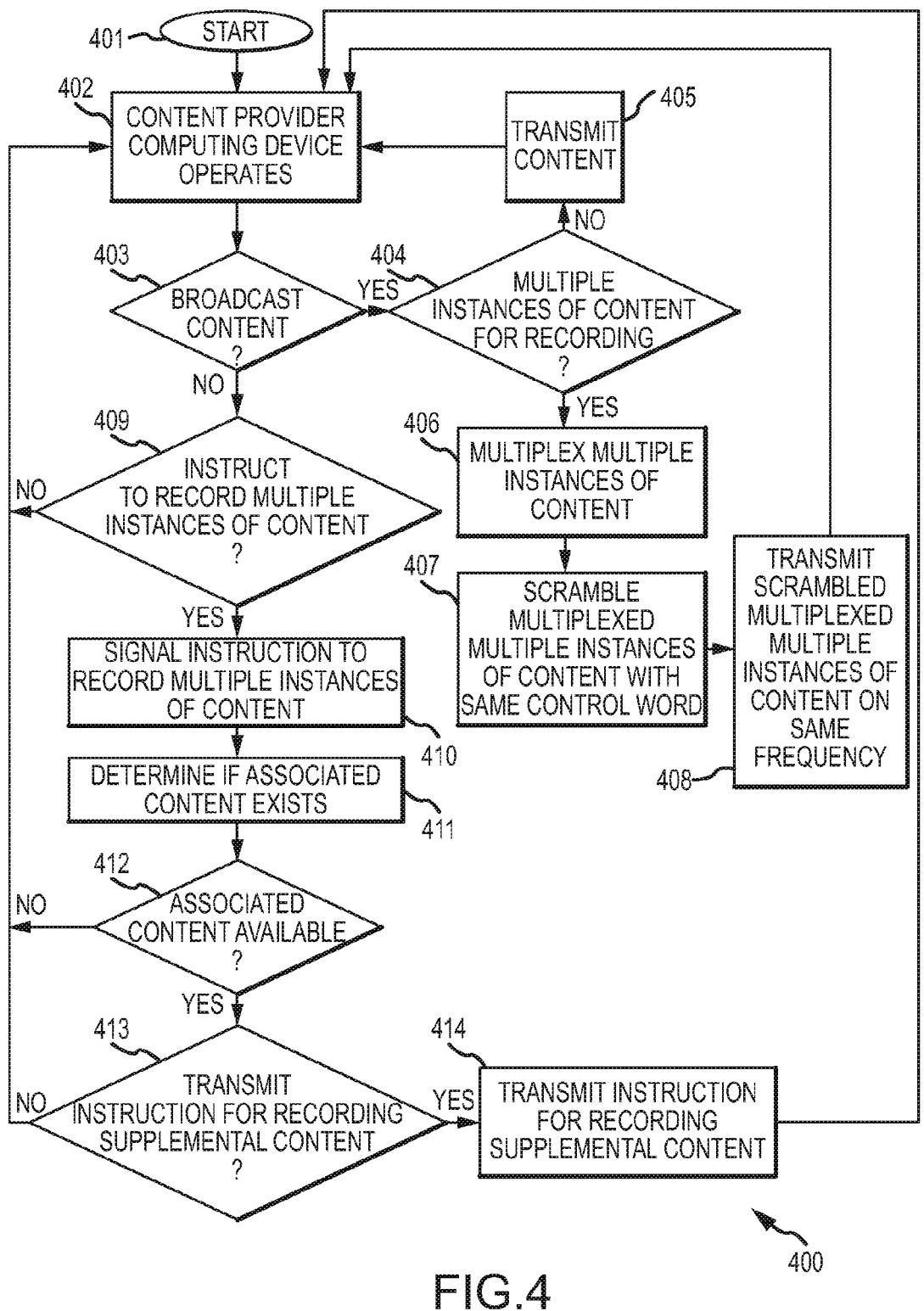
FIG. 4 is a flow chart illustrating a second example method for automatically recording supplemental content. This method may be performed by the system of FIG. 2.

FIG. 4 illustrates a second example method 400 for automatically recording supplemental content. The method 400 may be performed by one or more computing devices of the content provider 1 202 of FIG. 2. The flow begins at block 401 and proceeds to block 402 where the computing device of the content provider 1 202 operates. The flow then proceeds to block 403 where the computing device of the content provider determines whether or not to broadcast content to the content receiver 201. The computing device of the content provider may broadcast content to the content receiver as part of broadcasting content to a plurality of different content receivers. If so, the flow proceeds to block 404. Otherwise, the flow proceeds to block 409.

At block 404, after the computing device of the content provider 1 202 determines to transmit content to the content receiver 201, the computing device of the content provider determines whether or not the content to be transmitted includes multiple instances of content to be automatically recorded. If not, the flow proceeds to block 405 where the computing device of the content provider transmits content to the content receiver before the flow returns to block 402 and the computing device of the content provider continues to operate. Otherwise, the flow proceeds to block 406.

At block 406, after the computing device of the content provider 1 202 determines that the content to be transmitted includes multiple instances of content to be automatically recorded, the computing device of the content provider multiplexes the multiple instances of content and the flow proceeds to block 407. At block 407, the computing device of the content provider scrambles the multiple instances of content utilizing the same control word. The flow then proceeds to block 408 where the computing device of the content provider transmits the scrambled and multiplexed multiple instances of content via the same frequency band of a broadcast. Next, the flow returns to block 402 where the computing device of the content provider continues to operate.

At block 409, after the computing device of the content provider 1 202 determines not to transmit content to the content receiver 201, the computing device of the content provider determines whether or not to transmit instructions to automatically record multiple instances of content to the content receiver. If not, the flow returns to block 402 and the computing device of the content provider continues to operate. Otherwise, the flow proceeds to block 410.

At block 410, after the computing device of the content provider 1 202 determines to transmit instructions to automatically record multiple instances of content to the content receiver 201, the computing device of the content provider signals the instructions and the flow proceeds to block 411. At block 411, the computing device of the content provider determines if content exists that is associated with the multiple instances of content. The flow then proceeds to block 412 where the computing device of the content provider determines whether or not associated content is available. If not, the flow returns to block 402 and the computing device of the content provider continues to operate. Otherwise, the flow proceeds to block 413.

At block 413, after the computing device of the content provider 1 202 determines that associated content is available, the computing device of the content provider determines whether or not to transmit supplemental instructions to the content receiver 201 to automatically record supplemental content. If not, the flow returns to block 402 and the computing device of the content provider continues to operate. Otherwise, the flow proceeds to block 414 where the computing device of the content provider transmits the supplemental instructions to the content receiver and the flow returns to block 402 where the computing device of the content provider continues to operate.

Returning to FIG. 2, in a first example, the content provider 1 202 may instruct the content receiver 201 to automatically record multiple instances of content, included in the same frequency band of a broadcast, corresponding to television programs broadcast by three of the four major television networks between the hours of seven PM and ten PM mountain time. The content provider 1 202 may desire to include such television programs broadcast by all four of the major television networks, but the same frequency band of the broadcast may not include sufficient capacity to include such television programs broadcast by all four of the major television networks. As such, the content provider 1 202 may transmit supplemental instructions specifying for the content receiver to record television programming aired by the fourth of the major television networks between the hours of seven PM and ten PM mountain time from a terrestrial broadcast source. Thus, subsequent to executing the instructions and the supplemental instructions, the content receiver may store all of the television programs broadcast by the four major television networks between the hours of seven PM and ten PM mountain time.

In a second example, the content provider 1 202 may instruct the content receiver 201 to automatically record multiple instances of content, included in the same frequency band of a broadcast, corresponding to television programs broadcast by the four major television networks between the hours of seven PM and ten PM mountain time. The content provider 1 202 may desire to also include television programs associated with a subchannel corresponding to one of the major four television networks for the above time period, but the content provider 1 202 may not have access to television programs associated with the subchannel. As such, the content provider 1 202 may transmit supplemental instructions specifying for the content receiver to record television programming aired associated with the subchannel during the time period mentioned above from a source where such television programs are available, such as a terrestrial broadcast source or an Internet source. Thus, subsequent to executing the instructions and the supplemental instructions, the content receiver may store the television programs broadcast by the four major television networks between the hours of seven PM and ten PM mountain time as well as the television programs associated with the subchannel for the same time period.

In a third example, the content provider 1 202 may instruct the content receiver 201 to automatically record multiple instances of content, included in the same frequency band of a broadcast, corresponding to television programs broadcast the four major television networks between the hours of seven PM and ten PM mountain time. However, the versions of the multiple instances of content available via the content provider 1 202 may have a lower resolution than the versions of the same instances of content available via another source, such as a terrestrial broadcast source and/or an Internet source (which may be the content provider 2 204). As such, the content provider 1 202 may transmit supplemental instructions specifying for the content receiver to record one or more versions of the multiple instances of content from the other source. The supplemental instructions in this example may be transmitted in response to one or more user requests received via the user interface component 210 of the content receiver.

As such, after executing the instructions and the supplemental instructions, the content receiver 201 may store the versions of the multiple instances of content recorded from the content provider 1 202 as well as one or more higher resolution versions of the multiple instances of content available from the other source. In some cases, the content receiver may overwrite one or more of the multiple instances of content recorded from the content provider 1 202 for which corresponding versions are recorded from the other source with the corresponding other version and/or otherwise delete the version recorded from the content provider 1 202.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for automatically recording supplemental content, the method comprising:
    receiving, at a content receiver from at least one first content provider, a plurality of instructions to record a plurality of instances of content from at least one broadcast received from the at least one first content provider via at least one first communication link wherein the plurality of instances of content are all included in the same frequency band of the broadcast and are all scrambled utilizing a same control word;

recording, utilizing the content receiver, at least one of the plurality of instances of content via the at least one first communication link as specified by the plurality of instructions;

receiving, at the content receiver from the at least one first content provider, at least one supplemental instruction to record at least one instance of supplemental content from at least one second content provider via at least one second communication link wherein the at least one instance of supplemental content is associated with at least one of the plurality of instances of content; and recording, utilizing the content receiver, the at least one instance of supplemental content via the at least one second communication link as specified by the at least one supplemental instruction.

2. The method of claim 1, wherein the at least one first communication link comprises at least one satellite communication link and the at least one second communication link comprises at least one of at least one terrestrial broadcast communication link or at least one internet protocol communication link.

3. The method of claim 1, further comprising deleting at least one of the recorded at least one of the plurality of instances of content after recording the at least one instance of supplemental content wherein the at least one recorded at least one of the plurality of instances of content and the at least one instance of supplemental content comprise different versions of a same instance of content.

4. The method of claim 1, wherein at least one of the plurality of instances of content is associated with at least one programming channel and the at least one instance of supplemental content is associated with at least one subchannel of the at least one programming channel.

5. The method of claim 1, wherein the plurality of instances of content are members of a group of content and the at least one instance of supplemental instance of content is a member of the group of content.

6. The method of claim 1, wherein the at least one supplemental instance of content has a higher resolution than content available from the at least one first content provider.

7. The method of claim 1, wherein the at least one supplemental instance of content is not available from the at least one first content provider.

8. The method of claim 1, wherein the at least one supplemental instruction is received from the at least one first content provider in response to at least one request submitted to the at least one first content provider by at least one user via the content receiver.

9. The method of claim 1, wherein the content receiver performs said operation of recording, utilizing the content receiver, the at least one instance of supplemental content via the at least one second communication link as specified by the at least one supplemental instruction when the content receiver fails to record one of the plurality of instances of content via the at least one first communication link as specified by the plurality of instructions wherein the at least one instance of supplemental content is a same instance of content as the one of the plurality of instances of content.

10. A system for automatically recording supplemental content, comprising:

at least one content receiver, comprising:

at least one first communication component that receives, from at least one first content provider, a plurality of instructions to record a plurality of instances of content from at least one broadcast received from the at least one first content provider utilizing the at least one first communication component and at least one supplemental instruction to record at least one instance of supplemental content from at least one second content provider utilizing at least one second communication component;

at least one non-transitory storage medium; and at least one processing unit that stores at least one of the plurality of instances of content received from the at least one first content provider utilizing the at least one first communication component in the at least one non-transitory storage medium in response to the plurality of instructions and stores the at least one instance of supplemental content received from the at least one second content provider utilizing the at least one second communication component in the at least one non-transitory storage medium in response to the at least one supplemental instruction;

wherein the at least one instance of supplemental content is associated with at least one of the plurality of instances of content, the plurality of instances of content are all included in the same frequency band of the broadcast, and the plurality of instances of content are all scrambled utilizing a same control word.

11. The system of claim 10, wherein the at least one first communication component receives the at least one supplemental instruction from the at least one first content provider in response to at least one request submitted to the at least one first content provider utilizing the at least one first communication component.

12. The system of claim 10, wherein the at least one processing unit stores the at least one instance of supplemental content when the at least one processing unit fails to store one of the plurality of instances of content wherein the at least one instance of supplemental content is a same instance of content as the one of the plurality of instances of content.

13. The system of claim 10, wherein the at least one supplemental instance of content is not available from the at least one first content provider.

14. The system of claim 10, wherein the at least one supplemental instance of content has a higher resolution than content available from the at least one first content provider.

15. The system of claim 10, the plurality of instances of content are members of a group of content and the at least one instance of supplemental instance of content is a member of the group of content.

16. The system of claim 10, wherein at least one of the plurality of instances of content is associated with at least one programming channel and the at least one instance of supplemental content is associated with at least one subchannel of the at least one programming channel.

17. The system of claim 10, wherein the at least one processing unit removes at least one of the stored at least one of the plurality of instances of content from the non-transitory storage medium after storing the at least one instance of supplemental content wherein the at least one stored at least one of the plurality of instances of content and the at least one instance of supplemental content comprise different versions of a same instance of content.

18. The system of claim 10, wherein the at least one first communication component comprises at least one satellite communication component and the at least one second communication component comprises at least one of at least one terrestrial broadcast communication component or at least one internet protocol communication component.

19. A method for automatically recording supplemental content, the method comprising:

transmitting, from at least one first content provider computing device to at least one content receiver, a plurality of instructions to record a plurality of instances of content from at least one broadcast transmitted by the at least one first content provider computing device via at least one first communication link wherein the plurality of instances of content are all included in the same frequency band of the broadcast and are all scrambled utilizing a same control word;

determining, utilizing the at least one first content provider computing device, to supplement the plurality of instances of content with at least one supplemental instance of content that is available from at least one second content provider via at least one second communication link based on an association between the at least one instance of supplemental and at least one of the plurality of instances of content;

transmitting, from at least one first content provider computing device to at least one content receiver, at least one supplemental instruction to record the at least one instance of supplemental content from the at least one second content provider via the at least one second communication link.

20. The system of claim 19, wherein the at least one first content provider computing device performs said operation of transmitting, from at least one first content provider computing device to at least one content receiver, a plurality of instructions to record a plurality of instances of content in response to receiving at least one request submitted to the at least one first content provider computing device by at least one user via the at least one content receiver.

* * * * *